(12) United States Patent
Moody et al.

(10) Patent No.: US 9,227,881 B2
(45) Date of Patent: Jan. 5, 2016

(54) REFRACTORY CASTABLES WITH HYDROPHOBIC AGGREGATES

(71) Applicant: BNZ Materials, Inc., Zelienople, PA (US)

(72) Inventors: Kenneth J. Moody, Augusta, GA (US); Bryan K. Doerr, Portersville, PA (US)

(73) Assignee: BNZ Materials, Inc., Zelienople, PA (US)

( * ) Notice: Subject to any disclaimer, the term of this patent is extended or adjusted under 35 U.S.C. 154(b) by 0 days.

(21) Appl. No.: 14/710,809

(22) Filed: May 13, 2015

(65) Prior Publication Data

US 2015/0259255 A1 Sep. 17, 2015

Related U.S. Application Data

(63) Continuation of application No. 14/279,536, filed on May 16, 2014.

(60) Provisional application No. 61/824,231, filed on May 16, 2013.

(51) Int. Cl.
| | |
|---|---|
| *C04B 41/50* | (2006.01) |
| *C04B 40/00* | (2006.01) |
| *F16L 59/02* | (2006.01) |
| *C09C 1/00* | (2006.01) |
| *C04B 28/06* | (2006.01) |
| *C04B 18/02* | (2006.01) |
| C04B 111/00 | (2006.01) |

(52) U.S. Cl.
CPC ........... *C04B 40/0032* (2013.01); *C04B 18/025* (2013.01); *C04B 28/06* (2013.01); *C09C 1/00* (2013.01); *F16L 59/028* (2013.01); *C04B 2111/00431* (2013.01)

(58) Field of Classification Search
CPC .. C09D 183/04; C09D 183/06; C09D 183/08; C04B 41/00; C04B 41/009
USPC .......................................... 106/287.1, 287.16
See application file for complete search history.

(56) References Cited

U.S. PATENT DOCUMENTS 3,563,786 A * 2/1971 Pierard et al. ................. 427/294
4,304,704 A * 12/1981 Billings ........................ 523/212
(Continued)

FOREIGN PATENT DOCUMENTS

| EP | 1264810 | 12/2002 |
|---|---|---|
| JP | 2000-203951 | 7/2000 |
| WO | 2013-030301 | 3/2013 |

OTHER PUBLICATIONS

International Searching Authority, Notification of the Transmittal of the International Search Report and the Written Opinion of the International Searching Authority, or the Declaration, Oct. 28, 2014, PCT/US2014/038360.

*Primary Examiner* — Noah Wiese
(74) *Attorney, Agent, or Firm* — Beck & Thomas, P.C.

(57) ABSTRACT

Hydrophobic aggregates for use in refractory castables and gunning mixtures and methods of their preparation. The aggregates here are formed by crushing insulating fire brick and coating the resulting particles with a hydrophobic component. The hydrophobic component may be a polydimethylsiloxane having a terminal silanol group. As a result of the coating process, the coated aggregate has very low levels of alkalis. The aggregates may be used to form refractory castables that do not undergo substantial alkaline hydrolysis due to the reduced levels of alkalis. The castables made from these aggregates display superior physical properties, including lower water content, lower permanent linear change, high strength, and superior thermal conductivity/insulation properties, while at the same time possessing lower density and requiring less water to be used during castable formation. These improved properties also are observed in gunning mixtures formed from these aggregates.

19 Claims, 1 Drawing Sheet

(56) References Cited

U.S. PATENT DOCUMENTS 5,964,934 A * 10/1999 Englert .................... 106/287.1
6,287,999 B1    9/2001 Hey et al.
8,038,790 B1 * 10/2011 Dubey et al. .................. 106/675
8,343,272 B2 *  1/2013 Rada et al. .................... 106/644
2010/0092411 A1 *  4/2010 Katusic et al. ................. 424/59

* cited by examiner

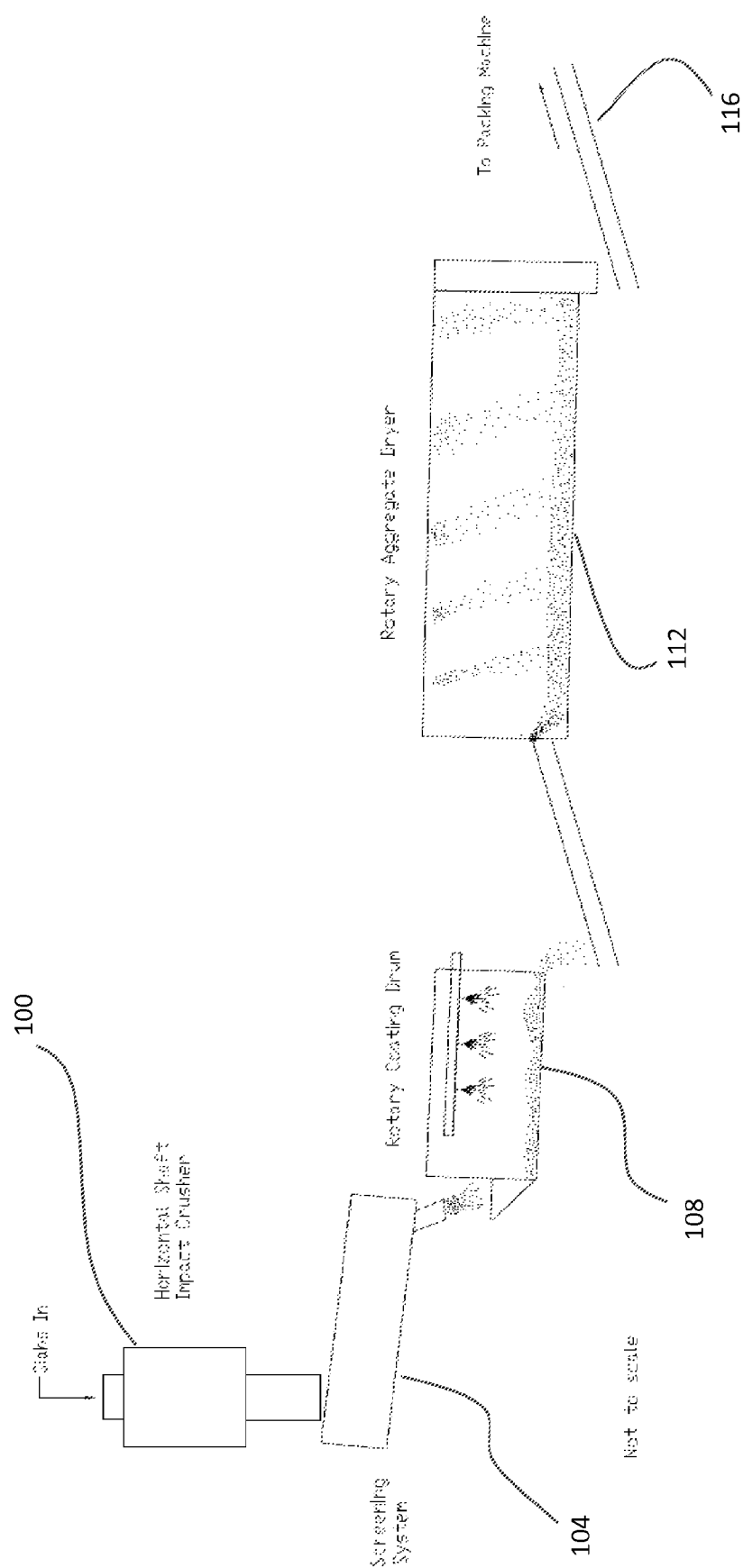

REFRACTORY CASTABLES WITH HYDROPHOBIC AGGREGATES

CROSS-REFERENCE TO RELATED APPLICATION

This application is a continuation of U.S. application Ser. No. 14/279,536 filed May 16, 2014, which in turn claimed priority to and the benefit of the filing date of U.S. Provisional Patent Application No. 61/824,231, filed May 16, 2013.

BACKGROUND OF THE INVENTION

1. Field of the Invention

The present invention generally relates to refractory castables, and in particular to refractory castables fabricated using aggregate coated with a hydrophobic component.

2. Description of the Background

Refractory castables (a.k.a. heat-resistant concretes) are composed of a heat-resistant aggregate and a heat-resistant hydraulic cement. Generally, refractory castables are formed from ground refractory materials containing a suitable percentage of added bonding agents. Refractory castables range from temperature-graded aggregates and hydraulic cements in proportions formulated to achieve desired properties for the particular end use. In practice, refractory castable mixes require only the addition of clean water during their application, for example, during pneumatic gunning, to form a heat resistant concrete piece or structure. Such refractory castables are utilized in a variety of industries, including metal foundries (e.g., iron, steel, and alumina), hydrocarbon processing, power generation, and mineral processing. Refractory castables are generally engineered to possesses specific properties (e.g., heat resistance, shrinkage, insulating capability, density) depending upon the particular application.

Refractory castable components, including aggregates, are generally shipped in dry form, blended with water, and then poured, cast, tamped, or applied in place by various means. For example, one means of applying refractory castables in place involves spraying the material (via either a dry or wet mix process) through the use of an air gun. The dry mix method involves placing the dry ingredients into a hopper and then conveying them pneumatically through a hose to the nozzle, then adding water at the nozzle as the material is impelled to the receiving surface. Mixing of the dry components with water is completed as the mixture hits the receiving surface. Conversely, the wet mix process involves pumping a previously prepared concrete (i.e., dry components already mixed with water) to the nozzle and introducing compressed air at the nozzle to impel the mixture onto the receiving surface. This wet mix application process is also referred to as "gunning" and castables applied in this manner are often referred to as "gunned" as opposed to cast.

Refractory castables are especially suited for furnace linings of irregular dimensions, for patching brickwork, and for applications that possess special shapes. Refractory castables are commonly used to line a heated chamber to provide heat insulation, thereby reducing heat loss from the chamber and increasing the efficiency of the overall process.

A considerable amount of work has been done over the years to improve the properties of refractory castables. For example, much work has been done to lower the water content required for casting refractory castables. For prior art systems, reduction in water used in casting leads to higher density castables having lower porosity. While these attributes are beneficial for thermal insulation properties, they also represent an engineering challenge as denser castables place a heavier load on the structures in which they are placed or applied.

One strategy for reducing the water content required for casting refractory castables is the use of dispersants and ultrafine particles in combination with particle packing principles. The dispersants minimize formation of flocs that raise water requirements. More optimum particle packing has been achieved by using progressively finer particles to fill in the voids between the coarser aggregates. Without these ultrafine particles, the voids between the coarser aggregates would fill with water during casting, thus, increasing the amount of water needed in the refractory castable. It will be appreciated by those skilled in the art that a substantial reduction in the amount of water required for casting refractory castables was realized with the discovery that ultrafine particles (i.e. particles having a diameter of less than about three microns) could be included in the products when used with appropriate dispersants. The ultrafine particles used for this purpose have been ultrafine refractory materials, namely, oxides, such as for example, microsilica and finely ground alumina being the most common choices. European Patent no. 0742416 discloses a spray operation method for monolithic refractories wherein a fine powder of alumina or fumed silica having a particle size of at most three microns imparts good flowability to the mixed batch of monolithic refractories. U.S. Pat. No. 5,549,745 and U.S. Pat. No. 5,512,325 disclose a non-slumping, high density, low moisture, low cement sprayable refractory castable composition which can be applied without forms containing a solid flow aid that is microsilica, 1 to 3 micron alumina, or mixtures thereof.

While these approaches achieve lower water requirements for casting, they also introduce drawbacks, particularly as relating to the use of microsilica and ultrafine alumina. For example, microsilica typically reduces high temperature refractoriness of refractory castables. In high alumina and fireclay castables bonded with calcium aluminate cement, for example, the microsilica combines with lime from the calcium aluminate cement when the castable is heated, forming low melting point glasses. These glasses may introduce problems such as making the castable more prone to creep at high temperatures, decreasing the hot strength, and increasing the susceptibility of the castable to chemical corrosion. In an attempt to deal with the problem of glass formation, refractory compositions with either no calcium aluminate cement, or reduced levels of calcium aluminate cement have been developed. The resulting lower lime contents reduce the amount of low melting glass that forms, but refractoriness is still not optimized because the microsilica in the matrix of the castable remain susceptible to chemical alteration and fluxing by constituents commonly found in the environments in which the castables were used.

Further, ultrafine alumina, when used to reduce the water required for casting refractory castables, is a substantial commercial impediment because of its high cost. In addition, ultrafine alumina can have a detrimental effect on the rheology of refractory castables, in particular those that are bonded with calcium aluminate cement. Refractory castables containing calcium aluminate cement and ultrafine alumina can exhibit short working times and poor casting characteristics. While not fully understood, it is believed that the ultrafine alumina provides nucleation sites for precipitation of hydrate phases from solution during mixing and placement of the castables. It is known by those skilled in the art that alumina-lime hydrate phases form on the edges of ultrafine alumina particles in suspensions of ultrafine alumina and calcium aluminate cement in water. It is believed that these hydrate phases affect the morphology of the finest constituents in the refractory castables, thereby adversely affecting rheology and casting characteristics.

Other ultrafine refractory oxides for reducing the amount of water required for casting refractory castables have similar drawbacks. For example, ultrafine chromic oxide is expensive and is undesirable from an environmental standpoint. Ultrafine titanium is also expensive and is generally regarded as a flux in refractory systems. Thus, despite the ability of various ultrafine refractory oxides to reduce the water required for casting refractory castables, no ultrafine refractory material heretofore has been found that is wholly satisfactory from either a technical, environmental, or economic standpoint. Further, it will be appreciated by those skilled in the art, that no ultrafine refractory material heretofore has been found that provides for reducing the amount of conventional ultrafine refractory oxides employed or for eliminating the use of conventional ultrafine refractory oxides to fill in the voids between the coarser refractory aggregates while at the same time maintaining particle packing principles for reducing the water content required for casting.

An additional challenge facing the refractory castable industry is the widespread problem of alkaline hydrolysis. In the presence of water, the calcium aluminate hydrate commonly found in refractory castables may react with alkali components of the castable. Through hydrolysis, the calcium aluminate hydrate breaks down into calcium carbonate and aluminum trihydrate. Depending on the atmospheric humidity and other potential sources of water, alkaline hydrolysis progresses slowly resulting initially in a thin soft surface on the castable. As time goes on, alkaline hydrolysis occurs at greater depths into the surface resulting in significant spalling of the castable and a concomitant degradation in the thermal insulation properties of the castable. When that physical and thermodynamic degradation progresses significantly, the operational life span of the castable is diminished and castable must be replaced. This, of course, requires shutdown of the industrial equipment to allow replacement of the damaged castables or, in some circumstances, replacement of the entire castable ensemble.

To slow down the alkaline hydrolysis reaction, numerous strategies are employed. For example, castable component may be dried extensively prior to shipping to the final plant destinations. The dryness of the castable must be maintained; if moisture is introduced to the dried castable, water penetrates the dry material quickly and alkaline hydrolysis will occur, leading to degradation of large portions of the castable. Another strategy is to apply organic coatings to the surface of the castable. This practice carries additional labor and material costs, and requires careful consideration of the potential of reaction of the organic coating with the interior environment of the industrial equipment that the castables line or coat. Further, the organic coating loses its effectiveness if physically disrupted.

Accordingly, there remains a very real and substantial need for a refractory composition, castable, and spray mix capable of lowering the amount of water required for casting or spraying the refractory castable composition while at the same time reducing or eliminating the undesirable characteristics known to exist in the prior art. These castables should possess exemplary physical and thermodynamic properties and would preferably confront many of the known challenges to castable industry. The present invention addresses this need.

SUMMARY OF THE INVENTION

The present invention provides hydrophobic aggregates for use in refractory castables and gunning mixtures and methods of their preparation. Generally, the aggregates of the present invention are formed from crushed insulating fire brick and coated with a hydrophobic component. The coated aggregate is then dried to reduce the moisture content of the coating, thereby allowing the coating to set. The aggregates may be used in the formation of castable components and gunning mixtures.

The aggregates of the present invention may formed from insulating fire brick of various compositions, including commonly used components such as granite/basalt, emery, olivine, chamotte, expanded chamotte, molochite, sillimanite, brown-fused alumina, white-fused alumina, tabular alumina, bubble alumina, calcined alumina, pumice, diatomite, vermiculite, perlite, clay, calcined clay, silica fume, spinel, magnesia, dolomite, silicon carbide, and combinations thereof.

In some embodiments, the hydrophobic component is a silicone-based composition, a siloxane-based composition, or a nanoscale ceramic. In some particularly useful embodiments, the hydrophobic component is a polydimethylsiloxane having a terminal silanol group. The polydimethylsiloxane may be applied to the crushed aggregate in an oil-in-water emulsion where the emulsified polydimethylsiloxane is diluted from 0.5 parts to about 99.5 parts per part of water. The polydimethylsiloxane emulsion is preferably applied in sufficient amounts to substantially coat substantially all of the aggregate.

As a result of the coating process, the coated aggregate has very low levels of alkalis (measured as sodium oxide), with levels less than about 0.45% commonly observed.

The aggregates of the present invention may be combined with a cement and optionally a filler to form refractory castables. In some embodiments, the filler may be clay. Because of the coating and low levels of alkali present in the aggregate and castable compositions, the refractory castables of the present invention do not substantively undergo alkaline hydrolysis, leading to dramatically longer life of the castables. The castables of the present invention may be rated for use at all temperatures at which traditional castables are used, but are particularly well suited for temperatures between about 2300° F. and about 3200° F.

The physical properties of refractory castables generated using the aggregates of the present invention are also dramatically improved compared to refractory castables formed using the aggregates of the present invention. For example, when using aggregates of the present invention, the amount of water required to form refractory castables is dramatically reduced—from about 20 out 50% lower than when prior art aggregates are employed. The water content of the castables of the present invention is similarly reduced, when compared to castables fabricated using prior art aggregate, by approximately 20 to 50%. Further, refractory castables generated using the aggregates of the present invention display a permanent linear change of about 50% less than a prior art castable using a non-coated aggregate.

Additionally, the high-temperature refractory castables of the present invention display a unique combination of low density, high strength, and improved thermal conductivity/insulation properties. Unlike prior art high-temperature refractory castables which require a higher density to achieve appropriate insulation properties, the high-temperature refractory castables of the present invention may possess densities ranging from 75 to 95 lb/ft$^3$, while at the same time having a heat storage value between about 30,000-45,000 BTU/ft$^2$ for a 12" thick castable block. The k-value of the high-temperature castables of the present invention may range from about 3 to about 5 BTU-in/ft$^2$-hr-° F. at 1000° F. Unlike prior art castables, this level of thermal conductivity/ insulation properties may be achieved without the use of perlite, thereby further reducing corrosion and alkaline hydrolysis in the refractory castables.

The refractory castables of the present invention may be used in a wide variety of industrial settings, including in furnaces, fired heaters, flues, kilns, catalytic cracking reactors, and flue gas treatment reactors.

The coated aggregates of the present invention may also be used in gunning mixtures for spray application of refractory compositions. Due to the hydrophobic coating of the aggregate of the present invention, gunning mixtures formed using the aggregates of the present invention require substantially less water to achieve flow properties appropriate for gunning and, further, reduce the pressure drop associated with pumping the gunning mixture.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 1 is a schematic of an exemplary process by which the coated aggregates of the present invention may be formed.

DETAILED DESCRIPTION OF THE INVENTION

It is to be understood that the FIGURE and description of the present invention have been simplified to illustrate elements that are relevant for a clear understanding of the invention, while eliminating, for purposes of clarity, other elements that are well known. The detailed description will be provided herein below with reference to the attached drawing.

The present invention addresses the limitations currently existing within the art and provides refractory castables having superior combinations of physical and insulation properties, while at the same time avoiding commonly encountered degradation processes. The castables of the present invention are formed with aggregate that is substantially coated with a hydrophobic material. The coated aggregate is able to be mixed in standard castable formulations while maintaining those hydrophobic properties. Additionally, the aggregates of the present invention bond with common components of castables, including calcium aluminate cements, Portland cements, hydratable aluminas, and phosphate binders, thus not requiring any special treatment after aggregate generation. Because the aggregate is coated with a hydrophobic component, the amount of water required to form the castable form is dramatically reduced. That provides the further benefit of reducing the time needed for dry out during initial heat up in industrial applications, as well as lowering the water-to-cement ratio of the castable, thereby improving the strength of the castable.

Refractory castables formed from those aggregates display the unique combination of low density and excellent thermal conductivity properties. Thus, the castables of the present invention represent a novel refractory castable for industry.

Furthermore, the hydrophobic coating largely eliminates free alkaline content in the castables. As a result, one of the key components of undesirable alkaline hydrolysis reactions is largely missing from the castables and degradation by alkaline hydrolysis is largely, if not entirely, avoided. As such, the refractory castables of the present invention are physically stable over longer periods of time when compared to the refractory castables of the prior art.

FIG. 1 displays an exemplary process by which the aggregates of the present invention may be formed. Initially, fire brick is formed by processes well known in the art. Following standard procedures of the art, fire brick are made from high purity refractory clays and other ceramic raw materials, as discussed further below. The fire brick may then be crushed (e.g., by using a horizontal shaft impact crusher 100) to form a blend of various particle sizes. The crushed firebrick may then be transferred to a screening system 104. The screens permit aggregate particles smaller than a particular size to pass through the screening system 104 and into a rotary coating drum 108. Typically, the particles exist as a mixture and may range from about $7/16"$ to about 200 mesh screen.

The present invention may employ any commonly used aggregate base. That includes granite/basalt, emery, olivine, chamotte, expanded chamotte, molochite, sillimanite, brown-fused alumina, white-fused alumina, tabular alumina, bubble alumina, calcined alumina, pumice, diatomite, vermiculite, perlite, clay, calcined clay, silica fume, spinel, magnesia, dolomite, silicon carbide, and combinations thereof. Those of skill in the art will also recognize other commonly employed aggregates that may be used in the context of the present invention. Further, since practicing the present invention results in encapsulation of the aggregate particles, the skilled practitioner may consider the use of aggregates that have been previously avoided over concerns of reactivity with the environment of the installed castables.

In some embodiments, the aggregates of the present invention have a base that ranges from about 35 to 85% aluminum oxide, about 15 to 55% silicon dioxide, about 0.1 to 1% ferric oxide, about 0.1 to 12% calcium oxide, and about 0.1 to 2.5% alkalis (as $Na_2O$). Additional components may be included as desired, as noted above.

The crushed fire brick may then be transferred to a system where the aggregate is sprayed with a fluid composition containing the hydrophobic component. In the embodiment displayed in FIG. 1, the hydrophobic-containing composition is delivered using a plurality of spray nozzles in a rotary coating drum 108, though one of skill in the art will recognize that numerous, well-known fluid administration mechanisms may be employed (e.g., a conventional conveyor belt with spray nozzles).

During the coating process, the hydrophobic component preferably adheres to the aggregate, and allows it to substantially coat the aggregate particles. Examples of compounds that may be used as hydrophobic components in the context of the present invention include various silicone-based formulations, nanoscale ceramic coatings, and other commonly known hydrophobic components used in commercial water-proofing of concrete.

In some embodiments, the hydrophobic component is an emulsion of polydimethylsiloxane. The polydimethylsiloxane may be terminated with a silanol moiety and formulated as an emulsion with water. When emulsified polydimethylsiloxane is used, it may be further diluted in water prior to being applied to aggregate. Generally, dilutions of the emulsified polydimethylsiloxane may range from about 0.5% emulsion to 99.5% water to an undiluted polydimethylsiloxane emulsion. In certain embodiments, the emulsified polydimethylsiloxane may be mixed with water at a 1% emulsion to 99% water ratio. One of skill in the art may select the appropriate dilution based on the aggregate base and the particular end-use application for the aggregate and refractory castable.

The amount of hydrophobic component applied to the aggregate is sufficient to substantially coat substantially all of the aggregate particles. The specific amount of hydrophobic may vary depending on the hydrophobic component, aggregate base, and dilution employed. Generally, the amount of solution containing the hydrophobic component applied to the aggregate will be greater than or equal to the weight of aggregate. In embodiments where 1:99 diluted polydimethylsiloxane emulsion is employed, the solution may be applied to the aggregate at 150 weight percent. That is, for every pound of aggregate to be coated, 1.5 pounds of polydimethylsiloxane-containing solution is applied to the aggregate. Again, the amount of hydrophobic component used may vary widely, with the goal being substantially complete coating of substantially all of the aggregate particles.

The coated aggregate is then dried under heat. The specific temperature chosen for drying may vary widely and depends, in part, on the specific hydrophobic component employed, the aggregate base, and resources available. Generally, sufficient heat is applied to drive off a substantial amount of the water present in the coating composition so as to allow the coating composition to set. The specific temperature to be used will vary with the type of hydrophobic component and composition employed. In the embodiment shown in FIG. 1, the heat is administered in a rotary aggregate dryer 112. The specific manner of heating may be varied widely with one of skill in the art recognizing many common ways of heating and drying (e.g., through a natural gas heater and a blower) the coated aggregate. The dried aggregate may then be packaged for shipment using a packing machine 116.

The coated aggregate of the present invention may be used as a raw material in forming a wide variety of castable components. The aggregates may be used as a component of cementitious compositions that are cast for use in any industrial and domestic setting where heat insulation is desired. For example, the refractory castables of the present invention may be used as hot-face refractory linings or as back-up insulation behind other refractories in furnaces, flues, kilns, catalytic cracking reactors, fired heater linings, and flue gas treatment reactors. One of skill in the art will recognize the utility of the refractory castables of the present invention in numerous additional applications.

As noted above, one particularly useful implementation of the present invention is in the formulation of refractory castables. The novel aggregates of the present invention may be formed into castables using the same components as used in the prior art. The novel aggregates of the present invention may be substituted for the prior art aggregates without changing the relative levels of other components of the formulation. The amount of water used in generating castables using aggregates of the present invention, however, is dramatically reduced due to the hydrophobic nature of the coated aggregate. The following table displays two comparable formulations—one using prior art aggregate and one using the aggregate of the present invention—as an example.

| Component | Formulation A (Prior art) | Formulation B (Present invention) |
| --- | --- | --- |
| Aggregate (Wt. %) | 54 | 54 |
| Wilson Clay (Wt. %) | 7 | 7 |
| Lumnite Cement (Wt. %) | 28 | 28 |
| Water (gal) | 55.7 | 31.4 |

As is shown in this illustrative example, the water usage is dramatically reduced when forming castables using the coated aggregates of the present invention. It is believed that during prior art castable formation the aggregate absorbs a substantial amount of water. The hydrophobic coating of the aggregates of the present invention dramatically reduces or substantially eliminates the water absorption that occurs. The reduction is water usage in this example is typical for castables formed using the aggregates of the present invention, with reductions of about 40% to about 60% commonly observed.

The reduced water content in the castables formed from the aggregates of the present invention leads to additional benefits. As the water content is reduced in any castable, the water-to-cement ratio is reduced with the resulting benefit in the cement forming strong bonds. Further, because less water is present, heating the castables during drying and firing causes smaller changes to the physical properties of the castables. Additionally, the castables formed from aggregates of the present invention display better strength. The physical properties of Formulations A and B are shown in the table below as illustrative examples.

| Component | Formulation A (Prior art) | Formulation B (Present invention) |
| --- | --- | --- |
| Density at 220° F. (lb/ft$^3$) | 71 | 63 |
| Density at 1500° F. (lb/ft$^3$) | 65 | 58 |
| Cold crushing strength at 1500° F. (psi) | 314 | 357 |
| Water content (%) | 55.7 | 31.4 |
| Permanent linear change (%), cast to dried | −0.13 | −0.05 |
| Permanent linear change (%), cast to fired (1500° F.) | −0.40 | −0.22 |

The values in the table are representative of the physical properties commonly observed in castables when using the aggregates of the present invention. Water content of the novel castables of the present invention are commonly about 20 to about 50% lower than castables using prior art aggregate. The permanent linear change is reduced by approximately 50%, while the cold crushing strength is consistently comparable or greater. The test method for assessment of permanent linear change is that included in ASTM method C113-02, which is hereby incorporated by reference. The strength of the castable, of course, may be manipulated to a desired level by addition of other components such as silica fume for the particular application at hand.

The reduced density of the castables of the present invention is a particularly striking feature of the present invention that carries additional benefits. Typically, prior art castable formulations include high levels of perlite to achieve desired densities and strengths. The use of perlite results in high levels of soluble alkali (approximately 1-2.9%, as $Na_2O$), which as discussed above, leads to alkaline hydrolysis and eventual physical failure of the castable. Additionally, the expected result of using a castable having lower density, as in the present example, is a lower strength castable. In contrast, the castables of the present invention have a lower density and, at the same time, a higher strength. Without being bound to theory, it is believed that because of the lower water content of the castables of the present invention, the bonds between aggregate and the calcium aluminate cements used in castable formation are stronger. In addition, the use of the coated aggregate of the present invention allows castables having the recited densities and strengths to be achieved without the use of perlite. As a result, the soluble alkali levels of the present invention may be very low (approximately 0.45% and less, as $Na_2O$). Accordingly, alkaline hydrolysis is dramatically reduced, if not substantially eliminated, in castables formed from the coated aggregates of the present invention.

The reduced densities of the castables of the present invention also contribute to superior thermal insulation properties. It is believed that the lower densities of the castables of the present invention are the result of air captured in the aggregate during the encapsulation process. As is well known, air is an excellent insulator, and the heat storage capacity of the refractory castables fabricated from the coated aggregates of the present invention may be approximately 50 to 60% lower (i.e., able to act as a better insulator) than castables made with prior art aggregates. The following example provides illustrative data demonstrating the superior combination of density and heat storage displayed by castables of the present invention.

Refractory castables are graded for use at particular temperatures set by the final industrial application for the castable. This example evaluates the thermal and physical properties of various prior art materials to inventive castables that might be used in a refractory lining of a cyclic furnace that operates at 2800° F. and which use a base of approximately 60% alumina. For a refractory castable of the present invention, the service temperature (i.e., the maximum temperature at which the castable may be used before it physically fails) may be varied widely by modifying numerous factors, including the aggregate base employed. The results observed here for operation at 2800° F. are representative of results using castables employed for other operating and service temperatures. Typically, the prior art employed medium-to-high density refractory components to line the walls of furnaces operating in this temperature range. In the prior art, high-density materials are used to achieve a lining having the thermal properties needed to maintain adequate insulation of the furnace. Examples of prior art refractory materials include 85 alumina-based, clay-bonded plastic, 3000 general performance, and 3000 high performance (having low cement of <5% by weight) castables. The following data are generated presuming a hot face temperature of 2800° F. and a lining thickness of 12 inches.

| Material | Density ($lb/ft^3$) | Cold face temp. (° F.) | Heat storage ($BTU/ft^2$) | k-value ($BTU\text{-}in/ft^2\text{-}hr\text{-}° F.$; at 1000° F.) |
|---|---|---|---|---|
| Castable of the present invention rated to 2800° F. | 76.1 | 332 | 28,974 | 3.03 |
| 85 plastic | 156 | 463 | 54,677 | 7.6 |
| 3000 General Performance | 130 | 468 | 51,925 | 9.5 |
| 3000 High Performance | 154 | 596 | 62,350 | 14.5 |

As is clear from the above example, high temperature castables formed from the coated aggregates of the present invention have a combination of low density and superior thermal conductivity (measured either as heat storage or as a k-value). The refractory castables of the present invention achieve superior insulation (approximately 40% better heat storage and approximately 45-50% better k-value in this example) while at the same time having a density that is more than 40% less than prior art refractory castables. The present invention allows coated aggregates to be used in thermally stable, high-temperature castable formulations that provide much lower densities and better insulating value than the prior art, while maintaining equivalent material strengths.

The high-temperature refractory castables of the present invention thus possess densities of approximately 75-95 $lb/ft^3$ and heat storage values ranging from approximately 30,000 $BTU/ft^2$ to approximately 45,000 $BTU/ft^2$ for a 12" block and k-values from about 3 to about 5 $BTU\text{-}in/ft^2\text{-}hr\text{-}° F$. This combination of low density and high insulation properties is not found in the prior art. As such, the castables of the present invention represent a novel tool for the castables industry. The prior art used much heavier refractory castables to obtain the same insulation. The use of the high-temperature castables of the present invention will dramatically lessen the engineering requirements of insulation systems because of the lighter physical load and will open new opportunities for the use of refractory castables as a result.

The aggregates of the present invention may also be used in gunning mixtures. Because of the hydrophobic nature of the coated aggregate, the fluid properties of gunning mixtures including the aggregates of the present invention are improved for pumping and gunning applications. Additionally, the use of the aggregates of the present invention lowers the water range required to be used during gunning. Because the aggregates of the present invention may include reduced water during use as gunning mixtures, the density will similarly be lower when the composition is gunned. This, in turn, dramatically reduces the pumping demands as this lower-density gunning mixture will flow better at lower water content. As a result, pumping of the gunning mixture is dramatically improved compared to prior art gunning mixtures.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

We claim:

1. A method of preparing hydrophobic aggregates for use in refractory castables, comprising:
    (a) crushing insulating fire brick (IFB) to a desired particle size to form an aggregate;
    (b) coating the aggregate with a hydrophobic component; and
    (c) drying the coated aggregate to less than 1% moisture.

2. The method of claim 1, wherein the IFB comprises granite/basalt, emery, olivine, chamotte, expanded chamotte, molochite, sillimanite, brown-fused alumina, white-fused alumina, tabular alumina, bubble alumina, calcined alumina, pumice, diatomite, vermiculite, perlite, clay, calcined clay, silica fume, spinel, magnesia, dolomite, silicon carbide, and combinations thereof.

3. The method of claim 1, wherein said hydrophobic component is silicone-based, a nanoscale ceramic, or a siloxane.

4. The method of claim 1, wherein said hydrophobic component is polydimethylsiloxane.

5. The method of claim 4, wherein the polydimethylsiloxane is present as emulsified silanol-terminated polydimethylsiloxane.

6. The method of claim 5, further comprising the step of diluting the emulsified polydimethylsiloxane in water prior to the coating step to a dilution of about 0.5 parts water to about 99.5 parts emulsified polydimethylsiloxane to about 99.5 parts water to about 0.5 parts emulsified polydimethylsiloxane.

7. The method of claim 5, wherein the coating step uses from about 1 to about 3 pounds of emulsified polydimethylsiloxane per pound of aggregate.

8. The method of claim 1, wherein substantially all of the aggregate is substantially covered with said hydrophobic component.

9. The method of claim 1, wherein the coated aggregate has less than about 0.45% by weight alkalis measured as sodium oxide.

10. A refractory castable, comprising:
   aggregate coated with a hydrophobic component, wherein the aggregate is formed by crushing an insulating fire brick;
   a cement; and
   optionally a filler.

11. The refractory castable of claim 10, wherein the filler is a clay.

12. The refractory castable of claim 10, wherein said hydrophobic component is polydimethylsiloxane.

13. The refractory castable of claim 10, wherein the refractory castable does not undergo substantial alkaline hydrolysis.

14. The refractory castable of claim 10, comprising less than about 0.45% by weight alkalis, measured as $Na_2O$.

15. The refractory castable of claim 10, wherein the refractory castable is rated for use at a temperature between about 2300° F. and about 3200° F.

16. The refractory castable of claim 10, having a density between about 75 $lb/ft^3$ and about 95 $lb/ft^3$ and a heat storage value between about 30,000 $BTU/ft^2$ and about 45,000 $BTU/ft^2$ for a 12" thick block.

17. The refractory castable of claim 10, having a density between about 75 $lb/ft^3$ and about 95 $lb/ft^3$ and k-values from about 3 to about 5 $BTU\text{-}in/ft^2\text{-}hr\text{-}° F$.

18. The refractory of claim 17, wherein said refractory castable does not include perlite.

19. The refractory castable of claim 10 adapted for use in furnaces, fired heaters, flues, kilns, catalytic cracking reactors, and flue gas treatment reactors.

* * * * *